US008824373B2

(12) United States Patent
Seo et al.

(10) Patent No.: US 8,824,373 B2
(45) Date of Patent: Sep. 2, 2014

(54) APPARATUS FOR TRANSMITTING AN UPLINK SIGNAL AND METHOD THEREOF

(75) Inventors: Inkwon Seo, Anyang-si (KR); Daewon Lee, Anyang-si (KR); Bonghoe Kim, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/583,519

(22) PCT Filed: May 17, 2011

(86) PCT No.: PCT/KR2011/003627
§ 371 (c)(1),
(2), (4) Date: Sep. 7, 2012

(87) PCT Pub. No.: WO2012/011658
PCT Pub. Date: Jan. 26, 2012

(65) Prior Publication Data
US 2012/0327884 A1    Dec. 27, 2012

Related U.S. Application Data

(60) Provisional application No. 61/366,909, filed on Jul. 22, 2010, provisional application No. 61/369,080, filed on Jul. 30, 2010.

(30) Foreign Application Priority Data

Apr. 1, 2011    (KR) .................. 10-2011-0030167

(51) Int. Cl.
*H04W 4/00*        (2009.01)
*H04W 72/12*       (2009.01)
*H04W 52/24*       (2009.01)

(52) U.S. Cl.
CPC ...... *H04W 72/1278* (2013.01); *H04W 72/1289* (2013.01); *H04W 72/1294* (2013.01); *H04W 52/24* (2013.01); *H04W 52/241* (2013.01); *H04W 52/242* (2013.01); *H04W 52/243* (2013.01); *H04W 52/244* (2013.01)
USPC .......................................................... 370/328

(58) Field of Classification Search
None
See application file for complete search history.

(56) References Cited

U.S. PATENT DOCUMENTS

2011/0103247 A1    5/2011    Chen et al.
2011/0243079 A1*   10/2011   Chen et al. .................... 370/329

FOREIGN PATENT DOCUMENTS

JP    2013-509842 A    3/2013
WO   WO 2009/123522 A1    10/2009

OTHER PUBLICATIONS

Author Unknown, Transmission Modes and Signaling for UL MIMO, 3GPP TSG RAN Working Group 1, Meeting 61, Submission R1-102826 by Texas Instruments, May 14, 2010, pp. 1-5.*

(Continued)

*Primary Examiner* — John Blanton
*Assistant Examiner* — Christopher Crutchfield
(74) *Attorney, Agent, or Firm* — Birch, Stewart, Kolasch & Birch, LLP

(57) ABSTRACT

An apparatus for transmitting an uplink signal and method thereof are disclosed, by which an uplink signal can be efficiently transmitted in a wireless communication system. The present invention includes receiving a downlink control information (DCI) used for PUSCH (physical uplink shared channel) scheduling, the DCI including an information for resource block allocation, an information for a channel status information request and a plurality of MCS (modulation and coding scheme) informations for a plurality of transport blocks and if a condition is met, transmitting a channel status information only on the PUSCH without a transport block for UL-SCH (uplink shared channel). Moreover, the condition includes a case that: only one transport block is enabled, the MCS information for the enabled transport block indicates an MCS index 29, the information for the channel status information request indicates 1, and the number of allocated resource blocks is equal to or smaller than 4.

14 Claims, 15 Drawing Sheets

(56) References Cited

OTHER PUBLICATIONS

Author Unknown, CQI feedback for LTE-A, 3GPP TSG RAN Working Group 1, Meeting 61bis, Submission R1-102826, Jul. 2, 2010, pp. 1-7.*

3GPP, "Technical Specification Group Radio Access Network; Evolved Universal Terrestrial Radio Access (E-UTRA); Physical layer procedures (Release 9)", 3GPP TS 36.213, V9.1.0, Mar. 2010, 79 pages provided.

Ericsson, "Discussion paper on test coverage for DL-SCH and UL-SCH Transport Block size selection", 3GPP TSG-RAN5 Meeting#42-bis, R5-091535, Mar. 23-27, 2009, 4 pages provided.

Ericsson, "TTI bundling", 3GPP TSG-RAN1 Meeting #55, R1-084549, Nov. 10-14, 2008, 15 pages provided.

Panasonic, "Reception of DCI formats", 3GPP TSG-RAN Meeting #55, R1-084664, Nov. 10-14, 2008, 12 pages provided.

Motorola, "Control Signalling for UL MIMO", 3GPP TSG RAN WG1 Meeting #61bis, R1-103930, Jun. 28-Jul. 3, 2010, 6 pages.

Qualcomm Europe, "Extending the UE feedback for efficient MU-MIMO and CoMP", 3GPP TSG RAN WG1 #59, R1-094875, Nov. 9-13, 2009, 5 pages.

Texas Instruments, "Transmission Modes and Signaling for UL MIMO", 3GPP TSG RAN WG1 61, R1-102826, May 10-14, 2010, 5 pages.

Catt, "CQI feedback for LTE-A", 3GPP TSG RAN WG1 Meeting #61bis, R1-103474, Jun. 28-Jul. 2, 2010, 7 pages.

* cited by examiner

\* The prescribed condition includes a case that:
only one transport block is enabled,
the MCS information for the enabled transport block indicates an MCS index 29,
the information for the channel status information request indicates 1, and
the number of allocated resource blocks is equal to or smaller than 4.

APPARATUS FOR TRANSMITTING AN UPLINK SIGNAL AND METHOD THEREOF

CROSS REFERENCE TO RELATED APPLICATIONS

This application is the National Phase of PCT/KR2011/003627 filed on May 17, 2011, which claims priority under 35 U.S.C. 119(e) to U.S. Provisional Application No. 61/366,909 filed on Jul. 22, 2010 and to U.S. Provisional Application No. 61/369,080 filed on Jul. 30, 2010, and under 35 U.S.C. 119(a) to Patent Application No. 10-2011-0030167 filed in Republic of Korea on Apr. 1, 2011, all of which are hereby expressly incorporated by reference into the present application.

TECHNICAL FIELD

The present invention relates to a wireless mobile communication system, and more particularly, to an apparatus for transmitting an uplink signal and method thereof.

BACKGROUND ART

Generally, a wireless communication system is developing to diversely cover a wide range to provide such a communication service as an audio communication service, a data communication service and the like. The wireless communication is a sort of a multiple access system Capable of supporting communications with multiple users by sharing available system resources (e.g., bandwidth, transmit power, etc.). For examples of the multiple access system, there are CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Problem

Technical Solution

Accordingly, the present invention is directed to a wireless communication system that substantially obviates one or more of the problems due to limitations and disadvantages of the related art.

An object of the present invention is to provide an apparatus for transmitting an uplink signal and method thereof, by which an uplink signal can be efficiently transmitted in a wireless communication system.

Another object of the present invention is to provide an apparatus for transmitting an uplink signal and method thereof, by which a control information can be efficiently transmitted.

A further object of the present invention is to provide an apparatus for transmitting an uplink signal and method thereof, by which a transmission of a control information can be efficiently controlled.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting an uplink signal from a user equipment in a wireless communication system according to the present invention includes the steps of receiving a downlink control information (DCI) used for PUSCH (physical uplink shared channel) scheduling, the DCI including an information for resource block allocation, an information for a channel status information request and a plurality of MCS (modulation and coding scheme) informations for a plurality of transport blocks and if a condition is met, transmitting a channel status information only on the PUSCH without a transport block for UL-SCH (uplink shared channel). Moreover, the condition includes a case that: only one transport block is enabled, the MCS information for the enabled transport block indicates an MCS index 29, the information for the channel status information request indicates 1, and the number of allocated resource blocks is equal to or smaller than 4.

To further achieve these and other advantages and in accordance with the purpose of the present invention, a user equipment, which is configured to transmit an uplink signal in a wireless communication system, includes a radio frequency (RF) unit and a processor configured to receive a downlink control information (DCI) used for PUSCH (physical uplink shared channel) scheduling, the DCI including an information for resource block allocation, an information for a channel status information request and a plurality of MCS (modulation and coding scheme) informations for a plurality of transport blocks, the processor if a condition is met, transmitting a channel status information only on the PUSCH without a transport block for UL-SCH (uplink shared channel). Moreover, the condition includes a case that: only one transport block is enabled, the MCS information for the enabled transport block indicates an MCS index 29, the information for the channel status information request indicates 1, and the number of allocated resource blocks is equal to or smaller than 4.

Preferably, the condition further includes a case that the number of transmission layer is 1.

Preferably, the channel status information includes at least one of a CQI (channel quality indication), a PMI (precoding matrix indicator) and an RI (rank indication).

Preferably, 'disable' of each of the transport blocks is indicated by a combination of two informations in the DCI, and one of the two informations is the MCS information of the corresponding transport block.

Preferably, the DCI includes two MCS informations for two transport blocks, and the DCI signals that a first transport block is enabled, and a second transport block is disabled.

More preferably, the second transport block is disabled using the MCS information for the second transport block.

Preferably, the DCI is received via PDCCH (physical downlink control channel).

It is to be understood that both the foregoing general description and the following detailed description are exemplary and explanatory and are intended to provide further explanation of the invention as claimed.

Advantageous Effects

Accordingly, the present invention provides the following effects and/or advantages.

First of all, the present invention is able to efficiently transmit an uplink signal in a wireless communication system.

Secondly, the present invention is able efficiently transmit a control information.

Thirdly, the present invention is able to efficiently control a transmission of a control information.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings. Wherever possible, the same reference numbers will be used throughout the drawings to refer to the same or like parts.

First of all, embodiments of the present invention are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a wireless technology as UTRA (universal terrestrial radio access), CDMA 2000 and the like. TDMA can be implemented with such a wireless technology as GSM/GPRS/EDGE (Global System for Mobile communications)/General Packet Radio Service/Enhanced Data Rates for GSM Evolution). OFDMA can be implemented with such a wireless technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

For clarity, the following description mainly concerns 3GPP LTE/LTE-A, by which the present invention is non-limited. Specific terminologies used in the following description are provided to help an understanding of the present invention. And, a usage of the specific terminology can be modified into other forms that come within the scope of the appended claims and their equivalents.

Figure 1:
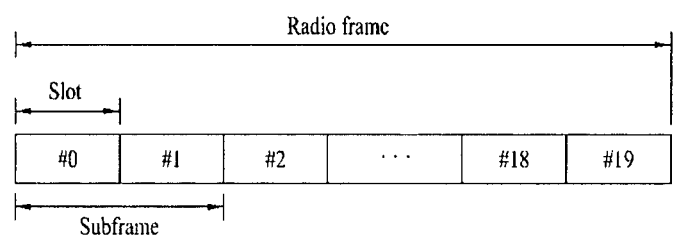
FIG. 1 is a diagram for one example of a structure of a radio frame.

FIG. 1 is a diagram for one example of a structure of a radio frame.

Referring to FIG. 1, a radio frame includes 10 subframes. Each of the subframes includes 2 slots in time domain. And, a time taken to transmit a subframe is defined as a transmission time interval (hereinafter abbreviated TTI). For instance, one subframe can have a length of 1 ms and one slot can have a length of 0.5 ms. One slot has a plurality of OFDM (orthogonal frequency division multiplexing) or SC-FDMA (single carrier frequency division multiple access) symbols in time domain. LTE uses OFDMA in DL and also uses SC-FDMA in UL. Hence, OFDM or SC-FDMA symbol indicates one symbol duration. A resource block (hereinafter abbreviated RB) is a resource allocation unit and includes a plurality of contiguous subcarriers in one slot. The structure of the radio frame shown in the drawing is exemplary. Optionally, the number of subframes included in a radio frame, the number of slots included in the subframe, and the number of symbols included in the slot can be modified by various schemes.

Figure 2:
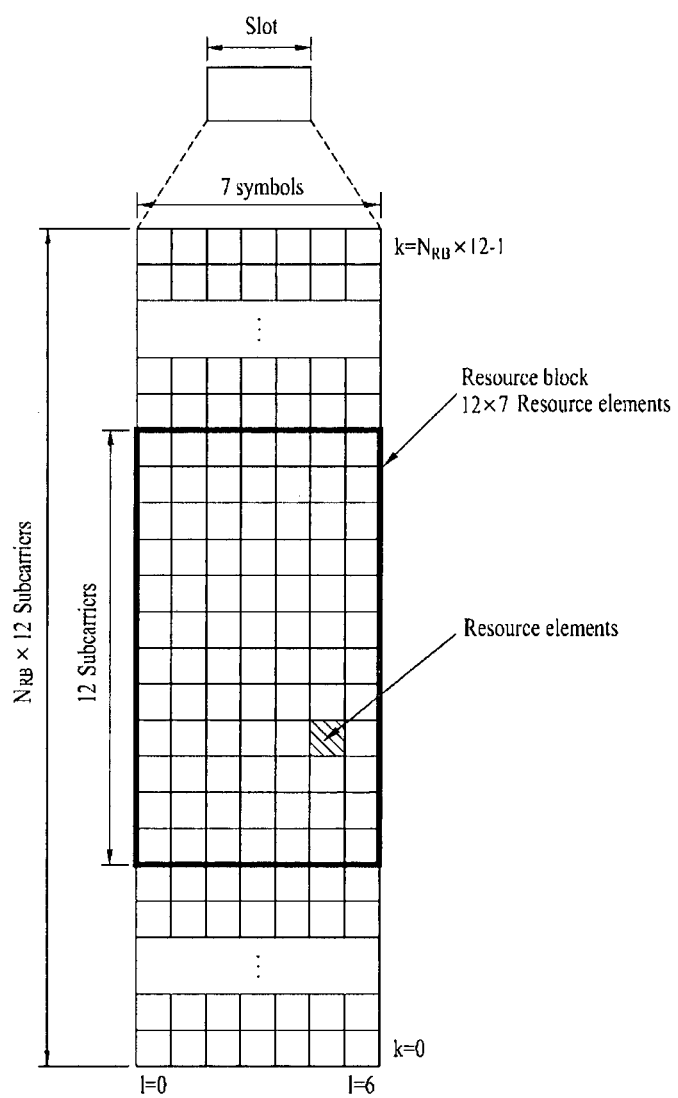
FIG. 2 is a diagram for one example of a resource grid of a downlink (hereinafter abbreviated DL) slot.

FIG. 2 is a diagram for one example of a resource grid of a DL slot.

Referring to FIG. 2, a DL slot includes a plurality of OFDM symbols in time domain. One DL slot includes 7 or 6 OFDM symbols and a resource block is able to include 12 subcarriers in frequency domain. Each element on a resource grid is named a resource element (hereinafter abbreviated RE). One RB includes 12×6 or 12×7 REs. The number $N_{RB}$ of RBs included in a DL slot depends on a DL transmission bandwidth. A structure of a UL slot is similar to that of the DL slot, in which OFDM symbol is substituted with SC-FDMA symbol.

Figure 3:
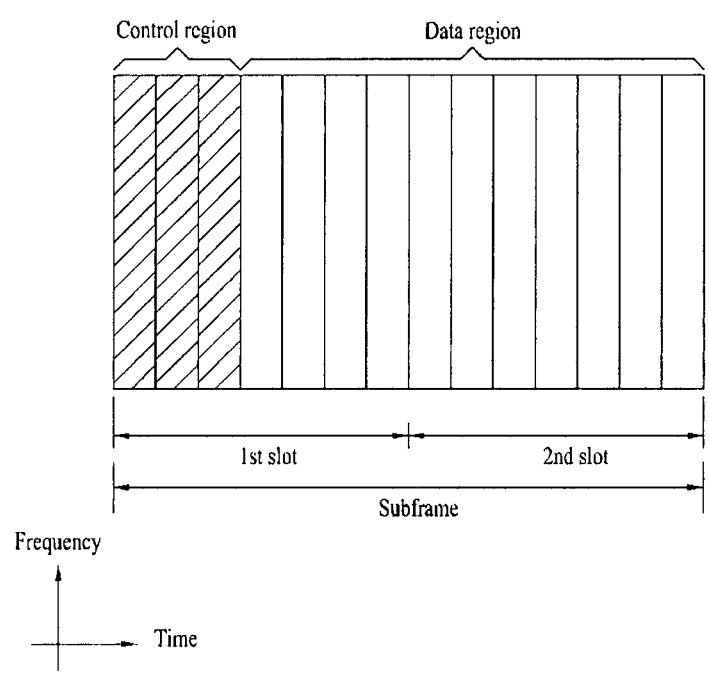
FIG. 3 is a diagram for a structure of a DL subframe.

FIG. 3 is a diagram for a structure of a DL subframe.

Referring to FIG. 3, maximum 3 or 4 OFDM symbols situated in a head part of a first slot of a subframe corresponds to a control region to which a control channel is allocated. The rest of the OFDM symbols correspond to a data region to which PDSCH (physical downlink shared channel) is allocated. Examples of a DL control channel used by LTE include PCFICH (Physical Control Format Indicator Channel), PDCCH (Physical Downlink Control Channel), PHICH (Physical hybrid ARQ indicator Channel) and the like. The PCFICH is transmitted in a first OFDM symbol of a subframe and carries information on the number of OFDM symbols used for a transmission of a control channel within the subframe. The PHICH carries HARQ ACK/NACK (Hybrid Automatic Repeat request acknowledgment/negative-acknowledgment) signal in response to a UL transmission.

The PDCCH carries transmission format and resource allocation information of DL_SCH (downlink shared channel), transmission format and resource allocation information of UL-SCH (uplink shared channel), paging information on PCH (paging channel), system information on DL-SCH, resource allocation information of such a higher layer control message as a random access response transmitted on PDSCH, Tx power control command set for individual UEs within a UE group, Tx power control command, activation indication information of VoIP (voice over IP) and the like. A plurality of PDCCHs can be carried on the control region. A user equipment is able to monitor a plurality of the PDCCHs. The PDCCH is carried on an aggregation of at least one or more contiguous CCEs (control channel elements). The CCE is a logical allocation unit used in providing the PDCCH with a coding rate based on a radio channel status. The CCE corresponds to a plurality of REGs (resource element groups). A format of the PDCCH and the number of PDCCH bits are determined in accordance with the number of CCEs. A base station determines a PDCCH format in accordance with a DCI which is to be transmitted to a user equipment and attaches a CRC (cyclic redundancy check) to a control information. The CRC is masked with an identifier (e.g., RNTI (radio network temporary identifier) in accordance with an owner of the PDCCH or a purpose of using the PDCCH. For instance, if the PDCCH is provided for a specific user equipment, an identifier (e.g., cell-RNTI (C-RNTI) of the corresponding user equipment can be masked on the CRC. In case that the PDCCH is provided for a paging message, a paging identifier (e.g., paging-RNTI (P-RNTI)) can be masked on the CRC. If the PDCCH is provided for system information (particularly, a system information block (SIC)), SI-RNTI (system information RNTI) can be masked on the CRC. If the PDCCH is provided for a random access response, RA-RNTI (random access-RNTI) can be masked on the CRC.

The control information transmitted on PDCCH is named a downlink control information (DCI). The DCI includes a resource allocation information for a user equipment or a user equipment group and other control informations. For instance, the DCI includes UL/DL scheduling information, UL transmission (Tx) power control command and the like.

Table 1 shows DCI format 0 for UL scheduling. In the following, although a size of RB allocation field is described as 7 bits, this is just exemplary. And, an actual size of the RB allocation field varies in accordance with a system bandwidth.

TABLE 1

| Field | Bits | Comment |
|---|---|---|
| Format | 1 | Uplink grant or downlink assignment |
| Hopping flag | 1 | Frequency hopping on/off |
| RB assignment | 7[a] | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

MCS: Modulation and Coding Scheme
TPC: Transmit Power Control
RNTI: Radio Network Temporary Identifier)
CRC: Cyclic Redunancy Check Table 2 shows information on an MCS index for UL data transmission in LTE. When 5 bits are used for MCS, 3 states ($I_{MCS}$=29~31) among the states expressible with 5 bits are reused for UL retransmission.

TABLE 2

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Figure 4:
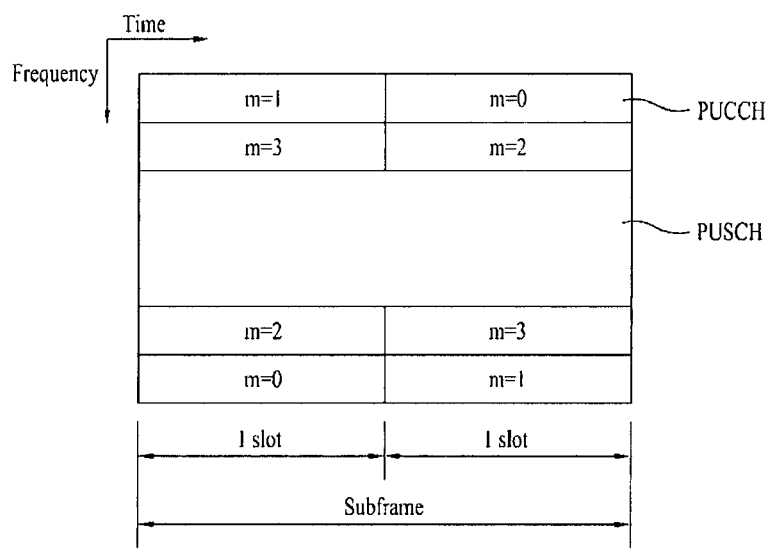
FIG. 4 is a diagram for one example of a structure of an uplink (hereinafter abbreviated UL) subframe.

FIG. 4 is a diagram for one example of a structure of a UL subframe.

Referring to FIG. 4, a UL subframe includes a plurality of slots (e.g., 2 slots). Each of the slots is able to include a different number of SC-FDMA symbols in accordance with a CP length. The UL subframe can be divided into a data region and a control region in frequency domain. The data region includes PUSCH and is used to transmit such a data signal as an audio and the like. The control region includes PUCCH and is used to transmit UL control information (UCI). The PUCCH includes an RB pair situated at both ends of the data region and performs hopping on the boundary of a slot.

The UL control information includes the followings.
  SR (scheduling request): This information is used to request an uplink UL-SCH resource and is transmitted by OOK (on-off keying) scheme.
  HARQ ACK/NACK: This is a response signal to a DL data packet on PDSCH. This signal indicates whether the DL data packet is successfully received. 1-bit ACK/NACK is transmitted in response to a single DL codeword. 2-bit ACK/NACK is transmitted in response to two DL codewords.
  CQI (channel quality indicator): This is feedback information on a DL channel. MIMO-related (multiple input multiple output related) feedback information includes RI (rank indicator) and PMI (precoding matrix indicator). Feedback information on a DL channel is generally known as channel quality control information, channel quality information, channel status information (CSI) or the like.

Figure 5:
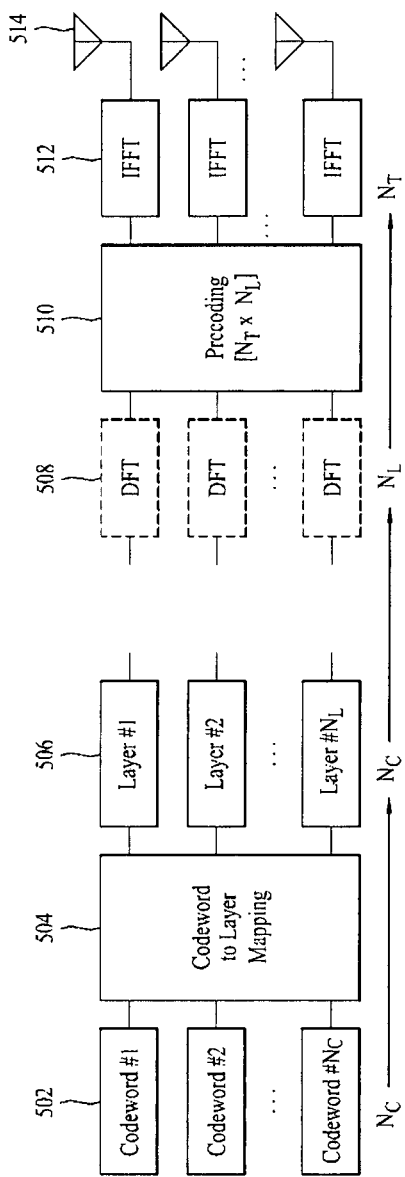
FIG. 5 is a diagram for one example of MIMO (multiple input multiple output) transmitter/receiver.

FIG. 5 is a diagram for one example of MIMO (multiple input multiple output) transmitter/receiver. In particular, FIG. 5 exemplarily shows OFDM or SC-FDMA (also known as DFT spread OFDM or DFT-s-OFDM) transmitter/receiver capable of supporting MIMO. In the drawing, if a DFT (discrete Fourier transform) block 508 is removed, an OFDM transmitter/receiver is shown. In the drawing, if a DFT (discrete Fourier transform) block 508 remains, an SC-FDMA transmitter/receiver is shown. For clarity and convenience, the following description with reference to FIG. 5 mainly concerns a transmitter operation and a receiver operation is accomplished in order reverse to that of the transmitter operation.

Referring to FIG. 5, a codeword to layer mapper 504 maps $N_c$ codewords 502 to $N_L$ layers 506. In this case, the codeword (CW) is equivalent to a transport block (TB) descending from a MAC (medium access control) layer. A corresponding relation between a transport block and a codeword can be changed by a codeword swapping. Hence, they can be generally referred to a (UL-SCH) data block. Moreover, unless specially mentioned, a codeword can be substituted with a corresponding transport block in the following description, and vice versa. A relation between a codeword and a transport block can be changed by the codeword swapping. For instance, in normal case, a first transport block and a second transport block correspond to a first codeword and a second codeword, respectively. On the contrary, if the codeword swapping is performed, the first transport block corresponds to the second codeword and the second transport block can correspond to the first codeword. Moreover, the HARQ operation is performed with reference to the transport block.

Figure 6:
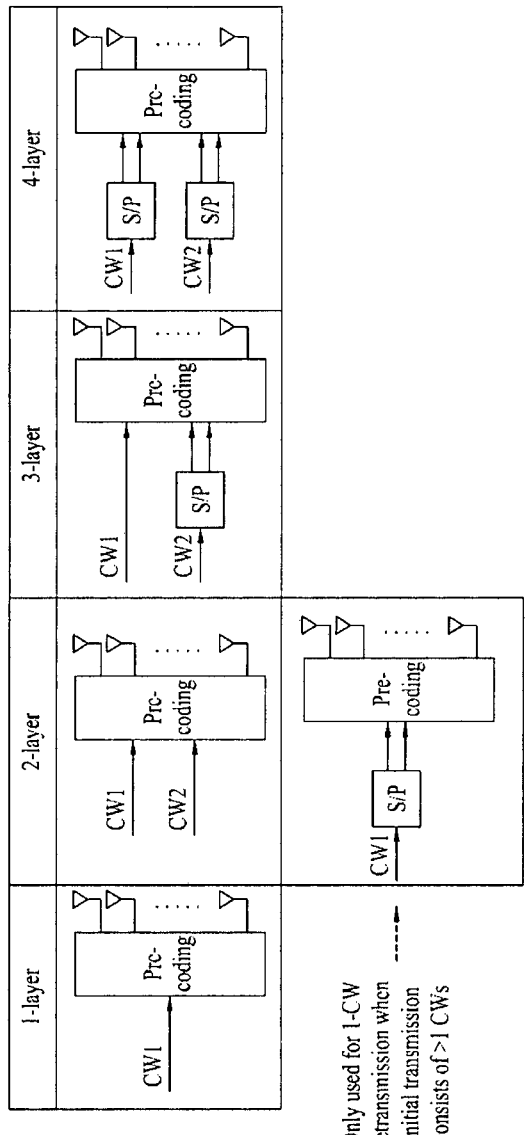
FIG. 6 is a diagram for one example of a codeword-to-layer mapping method.

Generally, a rank is identically used as the number layers in a communication system. FIG. 6 shows one example of a codeword-to-layer mapping scheme. In case of an SC-FDMA transmitter, a DFT block 508 performs a DFT precoding on each of the layers 506. A precoding block 510 multiplies $N_L$ DFT transformed layers by a precoding vector/matrix. Through this process, the precoding block 510 maps the $N_L$ DFT transformed layers to $N_T$ IFFT (inverse fast Fourier transform) blocks and $N_T$ antenna ports 514. In this case, the antenna port 514 can be mapped to an actual physical antenna again.

Although LTE-A supports UL MIMO transmission, the conventional LTE does not support the UL MIMO transmission. Therefore, if the DCI format 0 of the conventional LTE is directly applied to the UL MIMO, it may cause various problems. For instance, problems may be caused to rank adaptation and MCS table. In case of the DCI format 0, the number of NDI is 1 and the number of MCS is 1 as well. Yet, if two data streams are transmitted for a UL transmission, the one NDI and the one MCS are not sufficient for the UL transmission. Therefore, if the conventional DCI format is used as it is, it is not appropriate for the UL MIMO capable of transmitting at least one or more transport blocks.

Embodiment 1: Signaling for MIMO Control Information

In the following description, a scheme of transmitting a control information for UL MIMO efficiently is explained.

First of all, LTE-A provides a 3-bit precoding book to 2Tx antenna (port) for UL spatial multiplexing. And, LTE-A provides a 6-bit precoding book to 4Tx antenna (port). A codebook size according to rank per Tx antenna is shown in Table 3.

TABLE 3

| Rank (number of layers) | Codebook size | |
|---|---|---|
| | 2Tx case | 4Tx case |
| 1 | 6 (index 0~5) | 24 (index 0~23) |
| 2 | 1 | 16 (index 0~15) |

TABLE 3-continued

| Rank (number of layers) | Codebook size | |
|---|---|---|
| | 2Tx case | 4Tx case |
| 3 | | 12 (index 0~11) |
| 4 | | 1 |

Hence, in order to support UL MIMO, 3-bit PMI/RI information is required for the case of 2Tx or 6-bit PMT/RI information is required for the case of 4Tx. In particular, in order to signaling PMI/RI using the conventional DCI format 0, at least 6-bit PMI/RI filed should be added to the DCI format 0.

In order to support UL MIMO, codeword enable/disable should be also taken into consideration. Table 4 shows a case that PMI/RI is taken into consideration together with codeword enable/disable.

TABLE 4

| | Codebook size | | | |
|---|---|---|---|---|
| | 2Tx case | | 4Tx case | |
| Rank | 1 CW is disabled | 2 CWs are enabled | 1 CW is disabled | 2 CWs are enabled |
| 1 | 6 | — | 24 | — |
| 2 | — | 1 | 16 | 16 |
| 3 | — | — | — | 12 |
| 4 | — | — | — | 1 |

The conventional LTE is able to disable a codeword using a specific combination of MSC field and RV field of DCI format in DL. In particular, if an MCS index and an RV index in an MCS field and an RV field existing per codeword are set to 0 and 1, respectively, a corresponding codeword is recognized as a disabled codeword. Yet, in case of the DCI format 0 for UL, since MCS and RV are signaled via one field (hereinafter named MCS/RV field) by joint-encoding MCS and RV together, it is not able to utilize the method used for DL.

Assuming that MCS/RV field of DCI format for UL in LTE-A uses the same method of the DCI format 0 of the conventional LTE, a method for the codeword enable/disable is proposed as follows. In particular, the present embodiment proposes that the enable/disable of codeword is indicated by using a combination of MCS/RV field and NDI field, which are existing per codeword. And, the present embodiment proposes a method of reducing a codebook signaling overhead by dispersing a codebook or a precoding matrix index per the combination of the MCS/RV field and the NDI field.

Table 5 shows a scheme of signaling a control information for UL MIMO according to one embodiment of the present invention. The present scheme exemplarily shows a case of 2Tx antenna (port). In particular, Table 5 shows a part of DCI used for scheduling of PUSCH. In Table 5, NDI field and MCS/RV field are included in the DCI format 0 of the conventional LTE or can be included in a DCI format newly designed for UL MIMO in LTE-A. In Table 5, a codebook can mean the codebook defined for the 2Tx case for spatial multiplexing.

TABLE 5

| Codeword enable/disable | NDI | MCS/RV | PMI/RI (1 bit) |
|---|---|---|---|
| 1 CW is disabled | Toggled | 29 | '0' → index 0 in Rank1 codebook<br>'1' → index 1 in Rank1 codebook |
| | | 30 | '0' → index 2 in Rank1 codebook<br>'1' → index 3 in Rank1 codebook |
| | | 31 | '0' → index 4 in Rank1 codebook<br>'1' → index 5 in Rank1 codebook |
| 2 CWs are enabled | Toggled/Not toggled | 0~28 | Index 0 in Rank2 codebook |

Referring to Table 5, if NDI is toggled and MCS/RV field indicates one of 29, 30 and 31, a corresponding codeword is disabled. According to the conventional LTE rule, if NDI is toggled, it means a new transmission. If a value of MCS/RV field is set to 29~31, it means a retransmission. Hence, it is able to disable a specific codeword by utilizing the combination shown in Table 5 that is not used by the conventional LTE. Besides, if a value of the MCS/RV field is set to 0~28, both two codewords are enabled irrespective of a presence or non-presence of NDI toggle.

Meanwhile referring now to Table 4, if it is rank 1 in 2Tx case, one codeword is disabled. If it is rank 2, both two codewords are enables. On the other hand, if one codeword is disabled, a rank 1 transmission is performed. If both two codewords are enables, a rank 2 transmission is performed. Hence, the combination of the NDI and MCS/RV fields in Table 5 indicates the codeword enable/disable and the RI value together.

Meanwhile, referring to Table 4, the number of precoding matrixes for the rank 1 is 6. Hence, in case of the rank 1 (i.e., one codeword is disabled), 2 precoding matrixes are made to correspond to each of the values 29, and 31 of the MCS/RV field and it is able to indicate one of the two precoding matrixes using 1-bit PMI/RI field. Moreover, since the number of the precoding matrix for the rank 2 is 1, in case of the rank 2 (i.e., both two codewords are enabled), an addition bit for signaling the precoding matrix is not necessary. In particular, in case of the rank 2, a rank indication information can be utilized as the information for signaling the precoding matrix. Therefore, if the present invention is applied to the 2Tx case, it is able to perform the precoding matrix signaling, which is anticipated to need at least 3 bits, using 1 bit only. And, the codeword enable/disable can be signaled as well.

For another instance, in case of attempting to perform a signaling on a precoding matrix using 2 bits, one of MCS/RV indexes is designated to a reserved region and the precoding matrixes for the rank 1 can be appropriately distributed to the rest of the two indexes (e.g., MCS/RV indexes 29 and 30). For instance, PMI indexes 0, 1, 2 and 3 are distributed to the MCS/RV index 29, and PMI indexes 4 and 5 can be distributed to the MCS/RV index 30. Moreover, two sets of 3 PMI indexes can be distributed to each of the MCS/RV indexes 29 and 30.

Table 6 shows another scheme of signaling a control information for UL MIMO according to one embodiment of the present invention. The present scheme exemplarily shows a case of 4Tx antenna (port). In particular, Table 6 shows a part of DCI used for scheduling of PUSCH. In Table 6, NDI field and MCS/RV field are included in the DCI format 0 of the conventional LTE or can be included in a DCI format newly designed for UL MIMO in LTE-A. In Table 6, a codebook can mean the codebook defined for the 4Tx case for spatial multiplexing.

TABLE 6

| Codeword enable/disable | NDI | MCS/RV | PMI/RI (5 bit) |
|---|---|---|---|
| 1 CW is disabled | Toggled | 29 | index 0~23 in Rank1 codebook for 4Tx case |
| | | 30 | Index 0~15 in Rank2 codebook for 4Tx case |
| | | 31 | Reserved |
| 2 CWs are enabled | Toggled/Not toggled | 0~28 | Rank2(index 0~15) +<br>Rank3(index 0~11) +<br>Rank4(codebook 0)<br>(Total 29 states for precoding matrix signaling are needed) |

Table 6 is configured in a manner similar to that of the former description with reference to Table 5. In particular, if one codeword is disabled, MCS/RV index 29 indicates a rank 1 and is able to indicate one of 24 precoding matrixes for the rank 1 using 5-bit MCS/RV field. Likewise, MCS/RV index 30 indicates a rank 2 and is able to indicate one of 16 precoding matrixes for the rank 2 using 5-bit MCS/RV field. MCS/RV index 31 is available for other usages. If both two codewords are enabled, since the rank 1 does not exist and a codebook includes 16 precoding matrixes for the rank 2, 12 precoding matrixes for the rank 3, and one precoding matrix for the rank 4. Since the total number of the cases is 29, it is able to performa precoding matrixe signaling using the 5-bit PMI/RI field. Therefore, if the present invention is applied to the 4Tx case, it is able to perform the precoding matrix signaling, which is anticipated to need at least 6 bits, using 5 bits only. And, the codeword enable/disable can be signaled as well.

Figure 7:
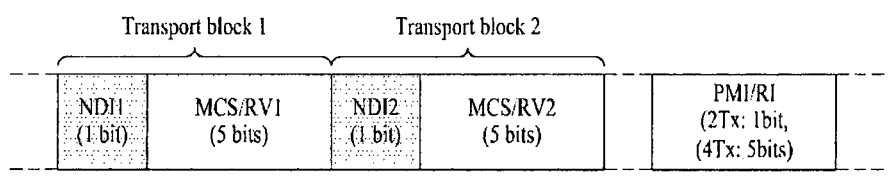
FIG. 7 is a diagram for a portion of a DCI format for UL spatial multiplexing.

FIG. 7 is a diagram for a portion of a DCI format for UL spatial multiplexing. And, the DCI format shown in FIG. 7 is used for the scheduling of PUSCH.

Referring to FIG. 7, DCI format carries information for two transport blocks. NDI1 field and MCS/RV1 field are configured for the transport block 1 and NDI2 field and MCS/RV2 field are configured for the transport block 2. One PMI/RI field is included in the DCI format only. Assume that the sizes and contents of the NDI and MCS/RV fields are equal to those of the DCI format 0 described with reference to Table 1 and Table 2. and, assume that a codebook size according to the rank and transmit antenna (port) configuration is equal to that shown in Table 3. In this case, the PMI/RI field can be constructed with 1 bit in case of 2Tx or 5 bits in case of 4Tx. If a DCI format is detected, a user equipment determines a size of a transport block, a modulation order, a redundancy version (RV), a transport block enable/disable, a transport layer (i.e., rank), a precoding matrix and the like from the field shown in FIG. 7. And, the fields shown in the drawing can be interpreted in the same manner of the former scheme described reference to Table 5 and Table 6.

According to the above description, the precoding matrix index and the like can be expressed by different combinations or schemes. And, the codeword disabling and the precoding matrix signaling can be implemented separately or in a manner being combined together.

Embodiment 2: Transmission of Channel Status Information in UL MIMO

First of all, it is necessary to announce channel status information (alternatively, channel control information or channel information) by feedback for efficient communications. For this, a channel status information of DL is transmitted in UL, while a channel status information of UL is transmitted in DL. The channel status information includes a channel quality indicator (CQI). In case of MIMO, the channel status information further includes PMI (precoding matrix indicator) and RI (rank indicator).

Figure 8:
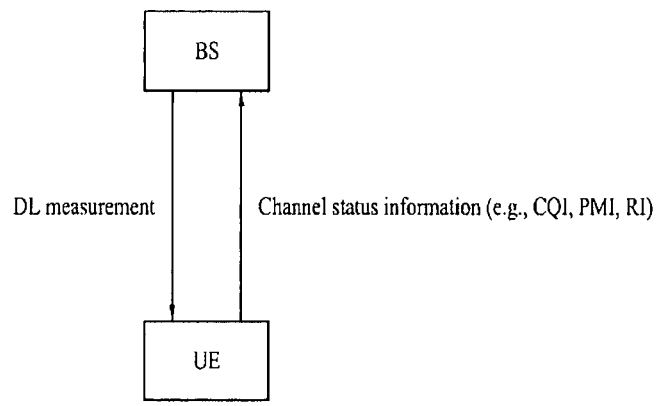
FIG. 8 is a diagram for one example of a concept for channel status information generation and transmission.

FIG. 8 is a diagram for one example of a concept for channel status information generation and transmission.

Referring to FIG. 8, a user equipment measures a DL quality and then reports a channel status information to a base station. The base station performs a DL scheduling (e.g., a UE selection, a resource allocation, etc.) in accordance with the reported channel status information. In this case, the channel status information includes at least one of CQI, PMI, RI and the like. In more particular, the CQI can be generated in various ways. For instance, a channel status (or a spectrum efficiency) is reported for the CQI in a manner of being quantized, an SINR is calculated and reported, or an actually applied channel status like a modulation and coding scheme (MCS) is reported.

Figure 9:
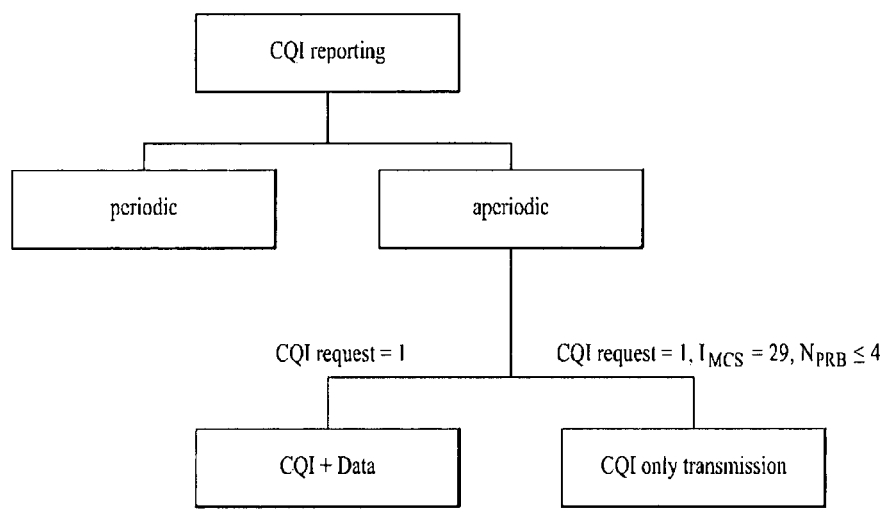
FIG. 9 is a diagram for one example of a CQI report scheme of LTE according to a related art.

FIG. 9 is a diagram for one example of a CQI report scheme of LTE according to a related art.

Referring to FIG. 9, a CQI report can be classified into a periodic report and an aperiodic report. The periodic CQI report means that a user equipment reports a channel quality at a predetermined timing point without a separate signaling. On the contrary, the aperiodic CQI report means that a network makes a request for a CQI report to a user equipment via explicit signaling if necessary. If the network needs the aperiodic CQI report, it signals a UL scheduling grant to the user equipment using a DCI format 0. If a CQI request value of the DCI format 0 is set to 1, the user equipment performs the aperiodic CQI report. The aperiodic CQI report (i.e., CQI request=1) can be divided into a CQI-only (transport) mode and a 'CQI+data' (transport) mode. If a CQI request value is 1, an MCS index $I_{MCS}$ is 29, and the number of allocated PRBs is equal to or smaller than 4 ($N_{PRB} \leq 4$), a user equipment interprets the corresponding signaling as the CQI-only mode. Otherwise, the user equipment interprets the corresponding signaling as the 'CQI+data' mode. In case of the CQI-only mode, the user equipment transmits a channel status information only via PUSCH without data (i.e., UL-SCH transport block). On the contrary, in case of the 'CQI+data' mode, the user equipment transmits the channel status information and data via PUSCH together. The CQI-only mode can be named a feedback-only mode by generalization, while the 'CQI+data' mode can be named a 'feedback+data' mode. And, the channel status information includes at least one of CQI, PMI and RI.

Figure 10:
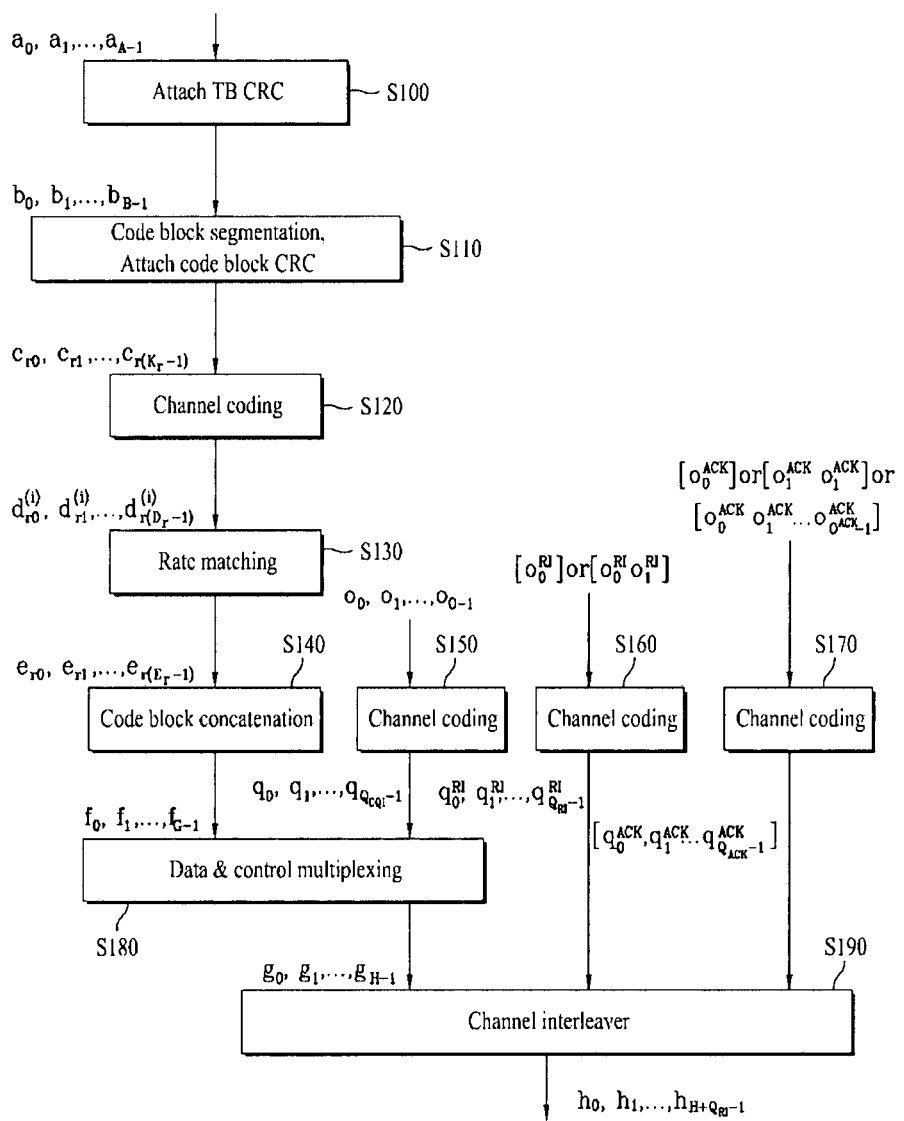
FIG. 10 is a diagram for one example of a method for processing UL-SCH data and control information.

FIG. 10 is a diagram for one example of a method for processing UL-SCH data and control information.

Referring to FIG. 10, an error detection is provided to a UL-SCH transport block through a CRC (cyclic redundancy check) attachment [S100].

All transport blocks are used to calculate CRC parity bits. In this case, bits of transport blocks are '$a_0, a_1, a_2, a_3, \ldots, a_{A-1}$', parity bits are '$p_0, p_1, p_2, p_3, \ldots, p_{L-1}$', a size of the transport block is A, and the number of the parity bits is L.

After completion of the transport block CRC attachment, code block segmentation and code block CRC attachment are performed [S110]. In this case; bit inputs for the code block segmentation are '$b_0, b_1, b_2, b_3, \ldots, b_{B-1}$'. And, 'b' indicates the bit number of the transport block (CRC included). The bits after the code block segmentation become '$c_{r0}, c_{r1}, c_{r2}, c_{r3}, \ldots, c_{r(K_r-1)}$' the 'r' indicates a code block number (r= 0, 1, ... C−1), and 'Kr' indicates the bit number of the code block 'r'. Moreover, the 'C' indicates a total number of the code blocks.

Channel coding is performed after the code block segmentation and the code block CRC [S120]. The bits after the channel coding become '$d_{r0}^{(i)}, d_{r1}^{(i)}, d_{r2}^{(i)}, d_{r3}^{(i)}, \ldots, d_{r(D_r-1)}^{(i)}$', where 'i=0, 1, 2' and the '$D_r$' indicates the bit number of $i^{th}$ coded stream for the code block r (i.e., $D_r=K_r+4$). In this case, the 'r' indicates a code block number (r=0, 1, ... C−1) and the 'Kr' indicates the bit number of the code block r. Moreover, the 'C' indicates a total number of the code blocks. For channel coding, turbo coding is available.

A rate matching is performed after completion of the channel coding [S130]. The bits after the rate matching become '$e_{r0}, e_{r1}, e_{r2}, e_{r3}, \ldots, e_{r(E_r-1)}$'. The $E_r$ indicates the number of the rate-matched bits of the $r^{th}$ code block. The 'r' is equal to 0, 1 ... (C−1). The 'C' indicates the total number of the code blocks.

A code block concatenation is executed after completion of the rate matching [S140]. After the code block concatenation, bits become '$f_0, f_1, f_2, f_3, \ldots, f_{G-1}$'. The G indicates a total number of the coded bits for transmission. If a control information is multiplexed with a UL-SCH transmission, the bits used for the control information transmission are not included in the G. In this case, the '$f_0, f_1, f_2, f_3, \ldots, f_{G-1}$' correspond to UL-SCH codewords.

In case of a UL control information (UCI), channel codings of channel quality information (CQI and/or PMI), RI and HARQ-ACK are independently performed. The channel coding of the UCI is performed based on the number of coded symbols for each control information. For instance, the number of the coded symbols can be used for the rate matching of the coded control information. The number of the coded symbols corresponds to the number of modulated symbols, the number of REs or the like after a subsequent process.

Channel coding of the channel quality information is performed using an input bit sequence of '$o_0, o_1, o_2, \ldots, o_{O-1}$' [S150]. In this case, an output bit sequence of the channel coding for the channel quality information becomes '$q_0, q_1, q_2, q_3, \ldots, q_{Q_{CQI}-1}$'. A channel coding scheme of the channel quality information varies in accordance with a bit number. And, if the channel quality information includes 11 bits or more, a CRC bit is added to the channel quality information. The $Q_{CQI}$ indicates a total number of coded bits. In order to enable a length of a bit sequence to match the $Q_{CQI}$, the coded channel quality information can be rate-matched. In this case, it is '$Q_{CQI}=Q'_{CQI} \times Q_m$', $Q'_{CQI}$ indicates the number of the coded symbols for CQI, and $Q_m$ is a modulation order. In particular, the $Q_m$ is set equal to UL-SCH data.

The channel coding of the RI is performed using an input sequence [$o_0^{RI}$] or [$o_0^{RI} o_1^{RI}$] [S160]. In this case, [$o_0^{RI} o_1^{RI}$] indicate 1-bit RI and 2-bit RI, respectively.

In case of the 1-bit RI, repetition coding is used. In case of the 2-bit RI, a simplex code (3, 2) is used and the encoded data can be cyclically repeated. An output bit sequence '$q_0^{RI}, q_1^{RI}, q_2^{RI}, \ldots, q_{Q_{RI}-1}^{RI}$' is obtained from the concatenation of the coded RI block(s). In this case, the $Q_{RI}$ indicates the total number of the coded bits. In order to enable a length of the coded RI to match the $Q_{RI}$, a last concatenated coded RI block can be a portion (i.e., the rate matching). It is '$Q_{RI}=Q'_{RI} \times Q_m$'. The $Q'_{RI}$ is the number of the coded symbols for the RI. The $Q_m$ is a modulation order. And, the $Q_m$ can be set equal to the UL-SCH data.

The channel coding of the HARQ-ACK is performed the input bit sequence [$o_0^{ACK}$], [$o_0^{ACK} o_1^{ACK}$] or [$o_0^{ACK} o_1^{ACK} \ldots o_{O^{ACK}-1}^{ACK}$] in the step S170. In this case, [$o_0^{ACK}$] and [$o_0^{ACK} o_1^{ACK}$] indicates 1-bit HARQ-ACK and 2-bit HARQ-ACK, respectively. And, the $[o_0^{ACK} \ o_1^{ACK} \ldots o_{O^{ACK}-1}^{ACK}]$ indicates the HARQ-ACK configured with information of 2 bits or more (i.e., $O^{ACK}>2$) ACK is coded into 1 and NACK is coded into 0. In case of the 1-bit HARQ-ACK, repetition coding is used. In case of the 2-bit HARQ-ACK, a simplex code (3, 2) is used and the encoded data can be cyclically repeated. The $Q_{ACK}$ indicates a total number of the coded bits and a bit sequence '$q_0^{ACK}, q_1^{ACK}, q_2^{ACK}, \ldots, q_{Q_{ACK}-1}^{ACK}$' is obtained from the concatenation of the HARQ-ACK block(s). In order to enable a length of the bit sequence to match the $Q_{ACK}$, a last concatenated coded HARQ-ACK block can be a portion (i.e., the rate matching). It is '$Q_{ACK}=Q'_{ACK} \times Q_m$'. The $Q'_{ACK}$ is the number of the coded symbols for the HARQ-ACK. The $Q_m$ is a modulation order. And, the $Q_m$ can be set equal to the UL-SCH data.

Inputs to a data/control multiplexing block include '$f_0, f_1, f_2, f_3, \ldots, f_{G-1}$' indicating the coded UL-SCH bits and '$q_0, q_1, q_2, q_3, \ldots q_{Q_{CQI}-1}$' indicating the coded CQI/PMI bits [S180]. And, an output from the data/control multiplexing block includes '$g_0, g_1, g_2, g_3, \ldots, g_{H'-1}$'. The $g_i$ is a column vector (i=0, ..., H'-1) of the length $Q_m$. It is $H'=H/Q_m$ and $H=(G+Q_{CQI})$. The 'H' indicates a total number of the coded bits allocated for the UL-SCH data and the CQI/PMI.

An input to a channel interleaver includes the output '$g_0, g_1, g_2, \ldots, g_{H'-1}$' from the data/control multiplexing block, the coded rank indicator '$q_0^{RI}, q_1^{RI}, q_2^{RI}, \ldots, q_{Q'_{RI}-1}^{RI}$' and the coded HARQ-ACK '$q_0^{ACK}, q_1^{ACK}, q_2^{ACK}, \ldots, q_{Q'_{ACK}-1}^{ACK}$' [S190]. The $g_i$ is a column vector of the length $Q_m$ for the CQI/PMI and it is 'i=0, ..., H'-1' ($H'=H/Q_m$). The $q_i^{ACK}$ is a column vector of the length $Q_m$ for the ACK/NACK and it is 'i=0, ..., Q'_{ACK}-1' ($Q'_{ACK}=Q_{ACK}/Q_m$). The $q_i^{RI}$ is a column vector of the length $Q_m$ for the RI and it is 'i=0, ..., Q'_{RI}-1' ($Q'_{RI}=Q_{RI}/Q_m$).

The channel interleaver multiplexes the control information and the UL-SCH data together for the PUSCH transmission. In particular, the channel interleaver includes a process for mapping the control information and the US-SCH data to a channel interleaver matrix corresponding to the PUSCH resource.

After the channel interleaving has been performed, a bit sequence '$h_0, h_1, h_2, \ldots, h_{H+Q_{RI}-1}$' read out of the channel interleaver matrix row by row is outputted. The read-out bit sequence is mapped onto a resource grid. Modulation symbols, of which number is '$H''=H'+Q'_{RI}$', is transmitted via subframe.

Figure 11:
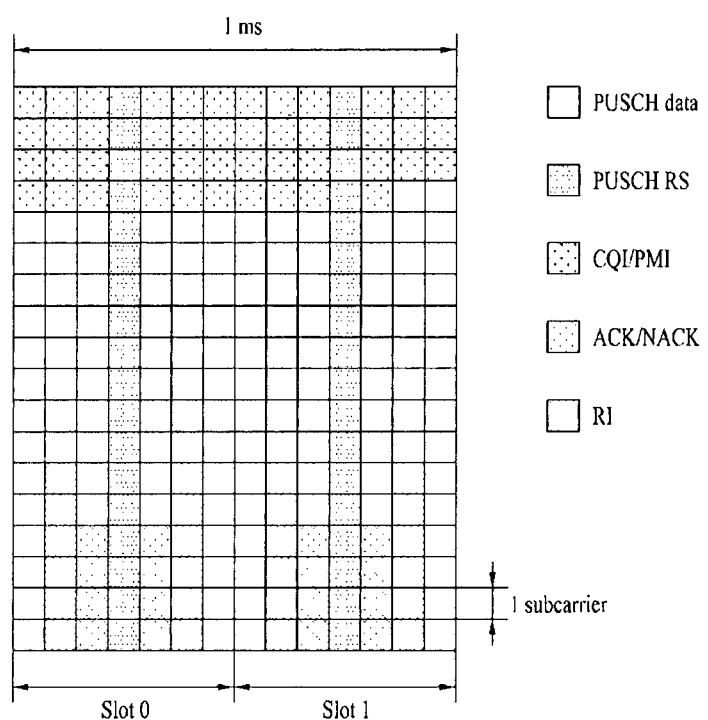
FIG. 11 is a diagram for multiplexing of control information and UL-SCH data on PUSCH.

FIG. 11 is a diagram for multiplexing of control information and UL-SCH data on PUSCH. First of all, in case of attempting to transmit a control information in a subframe having PUSCH transmission assigned thereto, a user equipment multiplexes the control information (UCI) and UL-SCH data together before DFT-spreading. In this case, the control information includes at least one of CQI/RI, HARQ ACK/NACK and RI. The number of REs used for the transmission of each of the CQI/RI, HARQ ACK/NACK and RI is based on an MCS (modulation and coding scheme) and offset value ($\Delta_{offset}^{CQI}, \Delta_{offset}^{HARQ-ACK}, \Delta_{offset}^{RI}$) assigned for the PUSCH transmission. The offset value allows a coding rate differing in accordance with the control information and is set semi-static by a higher layer signal (i.e., a signal of RRC). The UL-SCH data and the control information are not mapped to the same RE. The control information is mapped to exist in both slots of the subframe. Since a base station can be in advance aware that the control information will be transmitted on PUSCH, the base station is facilitated to perform a demultiplexing on the control information and data packets.

Referring to FIG. 11, a CQI and/or PMI (CQI/PMI) resource is situated at a start part of a UL-SCH data resource and is sequentially mapped to all SC-FDMA symbols on one subcarrier. Subsequently, another mapping is performed on a next subcarrier. The CQI/PMI is mapped in a left-to-right direction within a subcarrier, i.e., in SC-FDMA symbol index increasing direction. PUSCH data (i.e., UL-SCH data) is rate-matched in consideration of a quantity of the CQI/PMI resource (i.e., the number of coded symbols). The same modulation order of the UL-SCH data is used for the CQI/PMI. In case that a CQI/PMI information size (e.g., a payload size) is small (e.g., 11 bits or less), a block code (32, k) is used for the CQI/PMI information in a similar manner of the PUCCH transmission and the coded data is cyclically repeatable. If the CQI/PMI information size is small, a CRC is not used. If the CQI/PMI size is big (e.g., the corresponding size exceeds 11 bits), 8-bit CRC is added and a channel coding and a rate matching are performed using a tail-biting convolutional code. ACK/NACK is inserted in a portion of the resource of the UL-SCH data mapped SC-FDMA by puncturing. The ACK/NACK is situated next to the RS and the Corresponding SC-FDMA symbol is padded with the ACK/NACK from the bottom to the top of the SC-FDMA symbol, i.e., in a subcarrier index increasing direction. In case of a normal CP, SC-FDMA symbol for the ACKNACK, as shown in the drawing, is situated at the SC-FDMA symbol #2/#5 in each slot. No matter whether the ACK/NACK is actually transmitted in the subframe, the coded RI is situated next to the symbol for the ACK/NACK. Moreover, the ACK/NACK, the RI and the CQI/PMI are independently coded.

In LTE, control information (e.g., using QPSK modulation) can be scheduled to be transmitted on PUSCH without UL-SCH data. In particular, in case of the CQI-only mode, a user equipment transmits a channel status information only without a transport block for UL-SCH. In this case, a control information (e.g., CQI/PMI, RI and/or ACK/NACK) is multiplexed before DFT-spreading to maintain a single carrier characteristics. The multiplexing of the CQI/PMI, RI and ACK/NACK is similar to that shown in FIG. 10. SC-FDMA symbol for the ACK/NACK is situated next to RS and a CQI mapped resource can be punctured. The number of REs for the ACK/NACK and the RI is based on a reference MCS (CQI/PMI MCS) and an offset parameter ($\Delta_{offset}^{CQI}, \Delta_{offset}^{HARQ-ACK}, \Delta_{offset}^{RI}$). The reference MCS is calculated from a CQI payload size and a resource allocation. Channel coding and rate matching for the control signaling without UL-SCH data are equal to those of the case of the control signaling with the UL-SCH data.

In the following description, a scheme of transmitting a channel status information (hereinafter abbreviated CSI) in UL MIMO is proposed. Although the following description mainly concerns a case of supporting multiple antenna ports and 2 codewords (or transport blocks) in UL, it is just exemplary. And, the following description is identically applicable to a case of supporting more codewords (or transport blocks). In the following description, the codeword and the transport block are equivalent to each in meaning and can be substituted with each other unless mentioned differently. To help the understanding of the present invention, the following description is made using a CQI as a representative example of a channel status information and the channel status information and the CQI can be used in a manner of being substituted with each other.

Embodiment 2-1

The present embodiment proposes that a channel status information is reported using a single codeword only in case of performing a CQI-only mode. Therefore, when the CQI-only mode is performed, a single codeword (or a transport block) is enabled only. For this, the rest of codewords (or transport blocks) can be signaled as disabled. For instance, if a DCI is provided for 2 transport blocks, the DCI is able to carry a signaling information indicating that one transport block is enabled while the other is disabled. The transport block (or codeword) enable/disable can be indicated by a combination of two informations within the DCI and one of the two informations can include an MCS information. Preferably, if there is a disabled transport block (or codeword), an MCS information of the corresponding transport block (or codeword) is able to indicate an index related to an RV version. Moreover, in case that one codeword is the CQI-only mode, the rest of codewords (or transport blocks) can be recognized as disabled without a separate signaling.

Considering the conditions for the CQI-only mode of the conventional LTE together, the conditions for the CQI-only mode in UL MIMO can include the followings. First of all, only one transport block is enabled. Secondly, an information (e.g., CQI request) for a channel status information request indicates 1. Thirdly, an MCS information for the enabled transport block indicates an MCS index (e.g., $I_{MCS}$) 29. Fourthly, the number (e.g., $N_{PRB}$) of the allocated resource blocks is equal to or smaller than 4. In this case, a user equipment transmits a channel status information on PUSCH without a transport block for UL-SCH using a resource (e.g., modulation order, layer, resource block, etc.) for the one enabled transport block. The transmission of the channel status information without the transport block for the UL-SCH is non-limited by the above description. Alternatively, the channel status information transmission can be implemented by a process for determining a transport block size for an enabled transport block.

Meanwhile, since all codewords but one codeword for a channel status information are disabled, the space resource of the data transmission in UL MIMO is wasted. Yet, according to the present embodiment, it is able to lower an error rate of CQI information rather than the case of transmitting the CQI information together with data. Therefore, reliability of the channel status information can be raised.

Embodiment 2-1a

The present embodiment proposes that a transmission layer for a channel status information is additionally limited to 1 in case of performing a CQI-only mode [Rank 1 transmission]. Therefore, considering the conditions for the CQI-only mode of the conventional LTE, the conditions for the CQI-only mode in UL MIMO include the followings. First of all, only a single transport block is enabled. Secondly, the number of a transmission layer is 1. Thirdly, CQI request=1, $I_{MCS}$=29, and $N_{PRB}$≤4. 'Transport block disable' is indicated via signaling. Alternatively, if one transport block is in a CQI-only mode, the rest of transport blocks can be recognized as disabled without a separate signaling.

Embodiment 2-1b

The present embodiment proposes a method of obtaining a multiplexing gain by extending the number of layers for a channel status information to 2 (Rank 2 transmission) in case of performing a CQI-only mode. According to the present embodiment, the CQI-only mode can be triggered in the same manner of Embodiment 2-1a and 'disabling' can be implemented in the same manner as well. The number of transmission layers for the channel status information can be indicated by a PMI/RI field transmitted together with a new DCI format. In case of LTE-A uplink, since there is a rule for 1-codeword & 2-layer transmission for retransmission [cf. FIG. 6], it is not necessary to define 1-codeword to 2-layer mapping rule for the CQI-only mode in addition.

Figure 12:
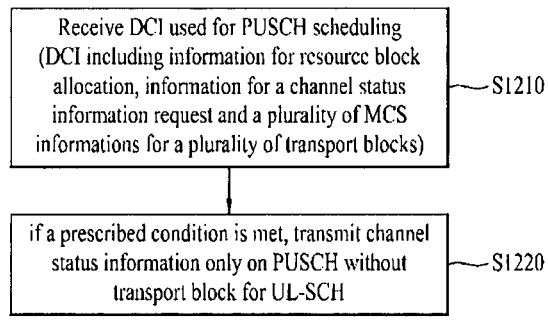
FIG. 12 is a flowchart for one example of transmitting a channel status information according to an embodiment of the present invention.

FIG. 12 is a flowchart for one example of transmitting a channel status information according to an embodiment of the present invention.

Referring to FIG. 12, a user equipment receives a DL control information (DCI) used for PUSCH scheduling [S1210]. According to the present example, DCI is provided for UL MIMO spatial multiplexing and includes information for a resource block allocation, information for a channel status information request, and a plurality of MCS informations for a plurality of transport blocks. If prescribed conditions are met, the user equipment transmits a channel status information only on PUSCH without a transport block for UL-SCH [S1220]. That is, if the prescribed conditions are met, the user equipment performs a CQI-only mode.

According to the embodiment 2-1, the prescribed conditions include the followings. First of all, only one transport block is enabled. Secondly, an information for a channel status information (e.g., a CQI request) (1 bit) indicates 1. Thirdly, an MCS information (5 bits) for the enables transport block indicates an MCS index (e.g., $I_{MCS}$) 29. Fourthly, the number ($N_{PRB}$) of the allocated resource blocks is equal to or smaller than 4. Moreover, according to the embodiment 2-1a, the prescribed conditions include the followings. First of all, only one transport block is enabled. Secondly, the number of a transmission layer is 1. Thirdly, CQI request=1, $I_{MCS}$=29 and $N_{PRB}$≤4.

For clarity and convenience, FIG. 12 exemplarily represents an aspect of the user equipment. Yet, it is apparent that a base station should perform a corresponding operation. For instance, the base station configures and transmits a DCI for requesting a channel status information, receives the channel status information via PUSCH without transport blocks, processes the channel status information and performs a DL scheduling if necessary.

Figure 13:
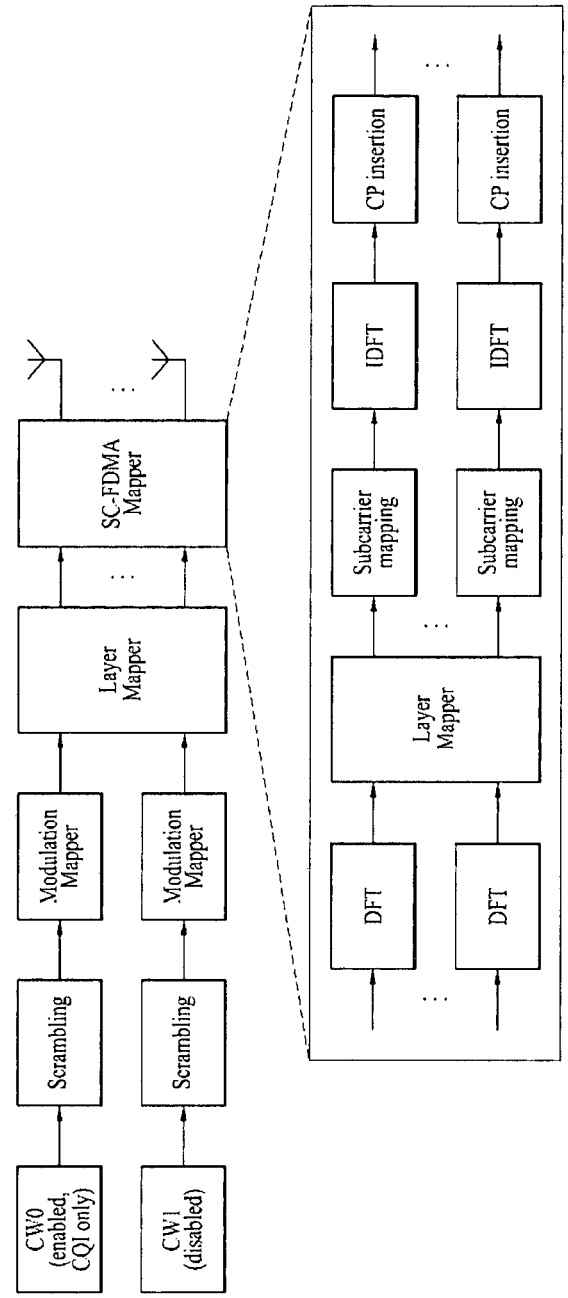
FIG. 13 and FIG. 14 are block diagrams for transmitting a channel status information.

FIG. 13 is a block diagram for transmitting a channel status information. For clarity and convenience, FIG. 13 assumes a case of enabling a codeword 0 (CW0) (or a corresponding transport block) and disabling a codeword 1 (CW1) (or a corresponding transport block).

Referring to FIG. 13, a channel status information is transmitted using CW0 only. In this case, the CW0 indicates a result from multiplexing a UL-SCH transport bock and the channel status information together. If CQI-only mode conditions are met, the CW0 includes the channel status information only. In particular, if the CQI-only mode is performed, the transport block for the UL-SCH is not included in the CW0. The CW0 is transmitted through a scrambling, a modulation mapper, a layer mapper and an SC-FDMA mapper. The layer mapper maps a codeword to a layer [cf. FIG. 6]. As proposed by the embodiment 2-1a and the embodiment 2-1b, in case of performing the CQI-only mode, the number of transmission layers can be limited to 1 or 2. The SC-FDMA modulation mapper includes a DFT (discrete Fourier transform) block, a precoder, a subcarrier mapping block, an IDFT (inverse discrete Fourier transform) block, and a CP adding block. In particular, the precoder maps a layer to an antenna port using a precoding matrix.

Embodiment 2-2

The present embodiment proposes a signaling method as follows. First of all, the present embodiment uses two codewords. In particular, one of the two codewords is provided for a CQI-only mode, while the other is provided for a data transmission. According to the present embodiment, a channel status information and a data are transmitted using different codewords, whereby reliability of a channel status information transmission can be raised. According to the conventional LET, a channel status information is multiplexed with PUSCH by rate matching or puncturing, whereby a coding gain of the PUSCH is lowered. Yet, according to the present embodiment, a coding gain of PUSCH remains intact, whereby data reliability is raised higher than that of the conventional LTE.

Embodiment 2-2a

The present embodiment is non-limited by the following description. And, the present embodiment proposes a signaling rule for smoothing the operation of the embodiment 2-2 or a signaling interpreting method of a user equipment. Since transmissions of a plurality of codewords (e.g., 2 codewords) are supported by UL MIMO, when an aperiodic CQI is transmitted, rules for determining a codeword, with which the CQI is multiplexed, are needed. The CQI multiplexing rules proposed by the present embodiment are described as follows. In particular, the following rules are applicable to a CQI-only mode as well.

Rule 1.1)

CQI is multiplexed with a codeword (or a transport block) having a highest $I_{MCS}$. Referring to Table 2, the higher the $I_{MCS}$ becomes, the better a channel status for the corresponding codeword (or transport block) gets. Therefore, the CQI is multiplexed with the codeword (or the transport block) having the highest $I_{MCS}$, whereby transmission reliability of the channel status information can be enhanced.

Rule 1.2)

The same $I_{MCS}$ is used for two codewords (or transport blocks), CQI is multiplexed with a codeword 0 (i.e., first codeword).

Although the above description assumes a case that one codeword operates in a CQI-only mode, the two rules according to the embodiment 2-2a are generally applicable to a case of multiplexing a channel status information and a data with PUSCH. For instance, when data are carried on two codewords, if a channel status information needs to be multiplexed with one of the codewords, the above-mentioned two rules are applicable.

Moreover, in case of the CQI-only mode (e.g., CQI request=1, $I_{MCS}$=29, $N_{PRB}$≤4), the following rule is additionally applicable with highest priority.

Rule 2)

First of all, CQI is multiplexed with a codeword ($I_{MCS}$=29) of two codewords (or two transport blocks).

If the embodiment 2-2a is applied, one exceptional case can take place. In particular, both $I_{MCS}$s of two codewords are set to 29, CQI request is equal to 1 (CQI request=1), and $N_{PRB}$, is equal to or smaller than 4 ($N_{PRB}$≤4). In other words, a case that a retransmission needs to be performed in one of the two codewords, while a CQI-only mode needs to be performed in the other can tack place. In this case, a user equipment is unable to interpret that the CQI is multiplexed with which one of the codewords. For such an exceptional case, the following solutions are proposed. According to a first solution, it is able to apply a CQI-only mode to a first codeword by applying the rule 1.2. According to a second solution, a CQI-only mode applied codeword is transmitted only (e.g., a CQI-only mode can be applied to the first codeword according to the rule 1.2), while the other codeword is disabled.

Figure 14:
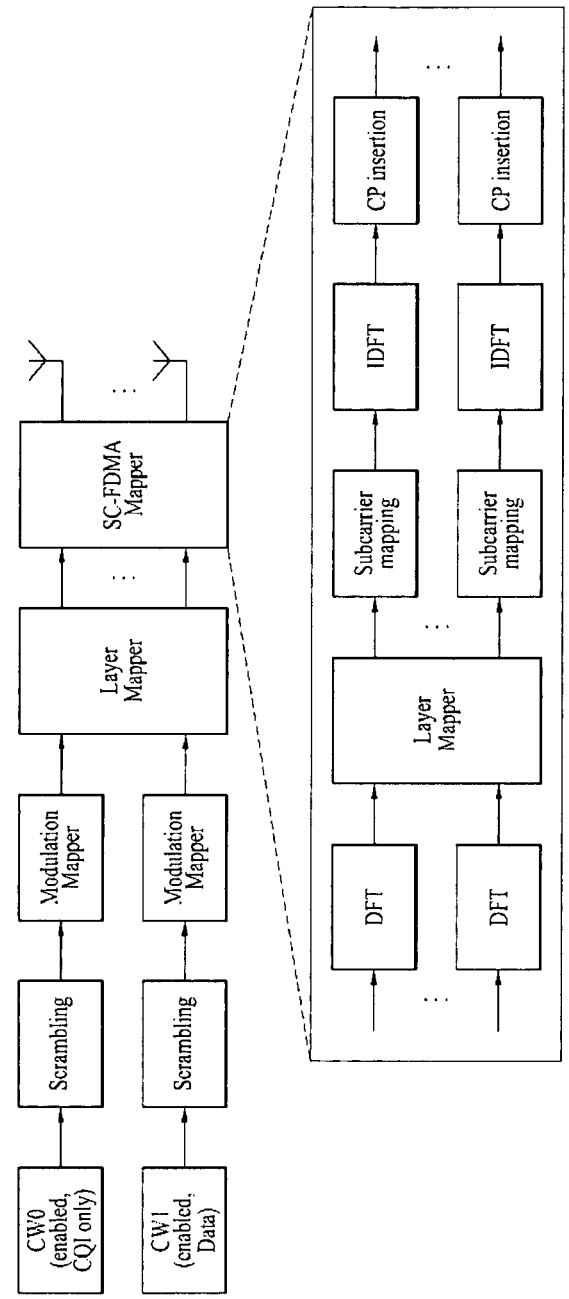

FIG. 14 is a block diagram for transmitting a channel status information.

Referring to FIG. 14, a channel status information is transmitted using CW0, while data (e.g., transport block for UL-SCH) is transmitted using CW1. The CW0 indicates a result from multiplexing a UL-SCH transport block and the channel status information together. In case of a CQI-only mode, the CW0 includes the channel status information without the transport block for the UL-SCH. Meanwhile, in case of a CQI+data mode, the CW0 includes both a corresponding transport block and a channel status information [not shown in the drawing]. Each of the CW0 and the CW1 is transmitted through a scrambling, a modulation mapper, a layer mapper and an SC-FDMA mapper. The SC-FDMA modulation mapper includes a DFT (discrete Fourier transform) block, a precoder, a subcarrier mapping block, an IDFT (inverse discrete Fourier transform) block, and a CP adding block. In this case, $I_{MCS}$ for the CW0 is higher than $I_{MCS}$ for the CW1 [Rule 1.1] or $I_{MCS}$ for the CW0 is equal to $I_{MCS}$ for the CW1 [Rule 1.2]. Moreover, $I_{MCS}$ for the CW0 is 29, while $I_{MCS}$ for the CW1 has a different value [Rule 2].

According to the embodiment 1 and the embodiment 2, a codeword (or transport block) disabling scheme and a transmission of a channel status information are included. And, the embodiment 1 and the embodiment 2 can be used independently or by being combined together. In the following description, various cases of combining the codeword (or transport) disabling scheme and the channel status information transmitting method together are exemplarily described with reference to the accompanying drawings.

Figure 15:
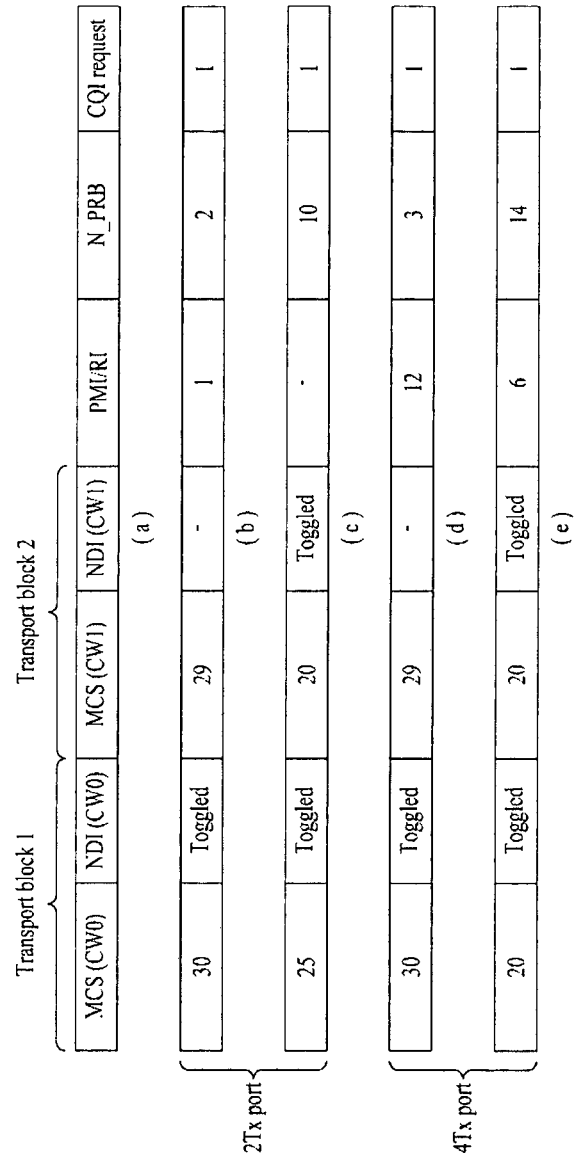
FIG. 15 is a diagram for one example of DCI configuration and UE interpretation according to an embodiment of the present invention.

FIG. 15 is a diagram for one example of DCI configuration and UE interpretation according to an embodiment of the present invention.

FIG. 15 (a) shows a portion of a DCI format newly added for LTE-A UL MIMO.

Referring to FIG. 15 (a), a DCI format includes MCS and NDI fields for a first transport block, MCS and NDI fields for a second transport block, a PMI/RI field, a resource allocation field (N_PRB), and a channel status information request field (CQI request).

FIGS. 15 (b) to 15 (e) exemplarily show DCI configurations and UE's interpretations in case of combining the codeword (or transport) disabling scheme and the channel status information transmitting method together. In particular, FIG. 15 (b) and FIG. 15 (c) show the cases of 2Tx and FIG. 15 (d) and FIG. 15 (e) show the cases of 4Tx.

FIG. 15 (b) shows one example of a 2Tx case for disabling one codeword and operating a CQI-only mode using the other codeword.

Referring to FIG. 15 (b), since MCS/RV is equal to 30 and a corresponding NDI is toggled, CW0 is disabled [cf. Table 5]. In this case, since PMI/RI is 1, an enabled CW (i.e., CW1) is precoded by a precoding matrix of which index of a rank 1 code book for 2Tx is 2 [cf. Table 5]. When the CW0 is disabled, as the CW1 meets the conditions of 'MCS/RV=29', 'CQI request=1', 'N_PRB≤4', it operates in a CQI-only mode. FIG. 15 (b) also shows a case that the transmission layer number is limited to 1 in the CQI-only mode.

FIG. 15 (c) shows one example of a 2Tx case of transmitting data on both two codewords and multiplexing one codeword with CQI.

Referring to FIG. 15 (c), CW0 has an MCS/RV equal to or smaller than 28 and CW1 has an MSC/RV equal to or smaller than 28. And, NDI is toggled. Therefore, both of the codewords are initial transmissions. Since CQI request is equal to 1 (i.e., CQI request=1), CQI is multiplexed with data. In this case, according to the rules of the embodiment 2-2a, the channel status information is multiplexed with the CW0 that is the codeword (or transport block) having the highest $I_{MCS}$. If both of the two codewords are enabled, one precoding matrix exists only. Hence, a value of the PMI/RI field is available for other usages.

FIG. 15 (d) shows an embodiment for a 4Tx case of disabling one codeword and operating a CQI-only mode through the other codeword.

Referring to FIG. 15 (d), since MCS/RV is equal to 30 and a corresponding NDI is toggled, CW0 is disabled [cf. Table 6]. In this case, since PMI/RI is 12, the other CW (i.e., CW1) is precoded by a precoding matrix (e.g., rank 2) meant by '12' in a rank 2 code book for 4Tx [cf. Table 6]. As the CW1 meets the conditions of 'MCS/RV=29', 'CQI request=1', 'N_PRB≤4', it operates in a CQI-only mode. Meanwhile, the present embodiment can show a case of operating a CQI-only mode using one codeword and transmitting channel status information via 2 layer.

FIG. 15 (e) shows a case of transmitting data on two codewords and multiplexing CQI with one of the two codewords.

Referring to FIG. 15 (e), CW0 is equal to or smaller than 28. CW1 is equal to or smaller than 28 as well. And, NDI is toggled. Hence, both of the two codewords are initial transmissions. If CQI request=1, the CQI is multiplexed with data. In this case, according to the rules of the embodiment 2-2a, since the MCS/RV ($I_{MCS}$) of the two codewords is identical, the channel status information is multiplexed with the CW0 that is the first codeword (or transport block). Moreover, a precoding matrix, which is meant by an index 6 in the rank 2, rank 3 and rank 4 code books for 4Tx, is used.

Embodiment 3: Modulation Order Control of Channel Status Information

The present embodiment proposes a CQI transmitting method in CQI-only mode if a payload for CQI is rapidly increased due to carrier aggregation (CA) and/or the like. In a CQI-only mode of the conventional LTE, a modulation order is limited to 2 (QPSK). If a CQI payload increases, it causes a problem that a coding rate is raised. Accordingly, the present invention proposes the followings. First of all, MPR (modulation order product code rate) is calculated through information received from a base station. If the calculated MPR is equal to or higher than a predetermined value, the present invention proposes to change a modulation order of a channel status information. In this case, the MPR can be calculated by the following formula.

$$MPR = \frac{Payload}{REs} = Coding\ rate * Modulation\ order$$

In particular, the MPR can be expressed as a multiplication of a coding rate and a modulation order. A user equipment is able to calculate the MPR using the number of available resource elements (REs) and a CQI payload size.

For instance, assuming that a coding rate '1/3' is a coding rate appropriate for demodulation, an MPR maximum value in accordance with each modulation order can be found as 'QPSK=(1/3)*2=2/3', '16-QAM=(1/3)*4=4/3', or '64-QAM (1/3)*6=2'. If the MPR exceed each of the numerical values, it is able to increment a modulation order of a channel status information. In particular, if a CQI payload is 360 bits and the number of available REs is 100, the MPR is 3.6. Hence, it is able to determine a modulation order as 64-QAM with reference to a coding rate '1/3'.

As mentioned in the above description, in case that a CQI payload increases, it may cause a problem that the QPSK or 16QAM may not be able to secure the performance due to a high coding rate. To solve this problem, an appropriate MPR value is specified to increment a modulation order. Therefore, it is able to maintain a CQI transmission performance even if the CQI payload increases. Besides, the same content can be implemented using a coding gain instead of the MPR.

Figure 16:
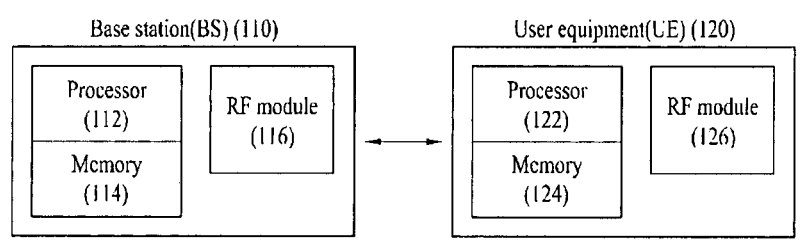
FIG. 16 is a diagram for one example of a base station and a user equipment applicable to one embodiment of the present invention.

FIG. 16 is a diagram for one example of a base station and a user equipment applicable to one embodiment of the present invention. In case that a relay is included in a wireless communication system, a communication is performed between a base station and a relay in a backhaul link or a communication is performed between a relay and a user equipment in an access link. Therefore, the base station or user equipment shown in the drawing can be substituted with the relay.

Referring to FIG. 16, a wireless communication includes a base station (BS) 110 and a user equipment (UE) 120. The base station 100 includes a processor 112, a memory 114 and a radio frequency (RF) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio signals. The base station 110 and/or the user equipment 120 can have a single antenna or a multi-antenna.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are described centering on the data transmission/reception relations between a base station and a terminal. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

As mentioned in the foregoing description, the present invention is applicable to such a wireless communication device as a user equipment, a relay, a base station and the like.

What is claimed is:

1. A method of transmitting an uplink signal from a user equipment in a wireless communication system, the method comprising:
   receiving a downlink control information (DCI) used for PUSCH (physical uplink shared channel) scheduling, the DCI including information for resource block allocation, information for a channel status information request and a plurality of MCS (modulation and coding scheme) information for a plurality of transport blocks; and
   if a condition is met, transmitting channel status information only on the PUSCH without any of the plurality of transport blocks,
   wherein the condition includes:
      only one transport blocks being enabled,
      the MCS information only for the enabled transport block indicating an MCS index 29,
      the information for the channel status information request being set to trigger the transmission of the channel status information, and
      the number of allocated resource blocks being equal to or smaller than 4.

2. The method of claim 1, wherein the condition further includes a case that the number of transmission layer is 1.

3. The method of claim 1, wherein the channel status information includes at least one of a CQI (channel quality indication), a PMI (precoding matrix indicator) and an RI (rank indication).

4. The method of claim 1, wherein 'disable' of each of the transport blocks is indicated by a combination of two information in the DCI, and one of the two information is the MCS information of the corresponding transport block.

5. The method of claim 1, wherein the DCI includes two MCS information for two transport blocks, and the DCI signals that a first transport block is enabled and a second transport block is disabled.

6. The method of claim 5, wherein the second transport block is disabled using the MCS information for the second transport block.

7. The method of claim 1, wherein the DCI is received via PDCCH (physical downlink control channel).

8. A user equipment configured to transmit an uplink signal in a wireless communication system, the user equipment comprising:
   a radio frequency (RF) unit; and
   a processor configured to receive a downlink control information (DCI) used for PUSCH (physical uplink shared channel) scheduling, the DCI including information for resource block allocation, information for a channel status information request and a plurality of MCS (modulation and coding scheme) information for a plurality of transport blocks, and if a condition is met, to transmit a channel status information only on the PUSCH without any of the plurality of transport blocks,
   wherein the condition includes:
      only one transport block being enabled only,
      the MCS information only for the enabled transport block indicating an MCS index 29,
      the information for the channel status information request being set to trigger the transmission of the channel status information, and
      the number of allocated resource blocks being equal to or smaller than 4.

9. The user equipment of claim 8, wherein the condition further includes a case that the number of transmission layer is 1.

10. The user equipment of claim 8, wherein the channel status information includes at least one of a CQI (channel quality indication), a PMI (precoding matrix indicator) and an RI (rank indication).

11. The user equipment of claim 8, wherein 'disable' of each of the transport blocks is indicated by a combination of two information in the DCI, and one of the two information is the MCS information of the corresponding transport block.

12. The user equipment of claim 8, wherein the DCI includes two MCS information for two transport blocks, and the DCI signals that a first transport block is enabled, and a second transport block is disabled.

13. The user equipment of claim 12, wherein the second transport block is disabled using the MCS information for the second transport block.

14. The user equipment of claim 8, wherein the DCI is received via PDCCH (physical downlink control channel).

* * * * *